United States Patent

Rash

[15] 3,650,377

[45] Mar. 21, 1972

[54] DRYER CONVEYOR MEANS

[72] Inventor: James T. Rash, Las Vegas, Nev.

[73] Assignee: Mouldings, Inc., Marion, Va.

[22] Filed: Nov. 19, 1970

[21] Appl. No.: 91,099

[52] U.S. Cl. ............................................198/190, 118/404
[51] Int. Cl. .........................................................B65g 15/12
[58] Field of Search ............198/190; 34/201, 162; 118/324, 118/239, 404

[56] References Cited

UNITED STATES PATENTS 1,781,750  11/1930  Dodge et al............................198/190

3,283,882  11/1966  Conrad..................................198/190

Primary Examiner—Richard E. Aegerter
Attorney—Mason, Fenwick & Lawrence

[57] ABSTRACT

A belt type conveyor is provided in which the upper flights of plural conveyor belts ride in an elongated slot canted with respect to the axis of the belt so that line contact is provided for supported articles on the flights by a corner edge of each belt with strip elements being projected above the conveyor to engage a first abutment and rebound against a second abutment for positioning the strip elements on the conveyor for movement through a dryer.

3 Claims, 4 Drawing Figures

Patented March 21, 1972

INVENTOR
JAMES T. RASH
BY Mason, Fenwick & Lawrence
ATTORNEYS

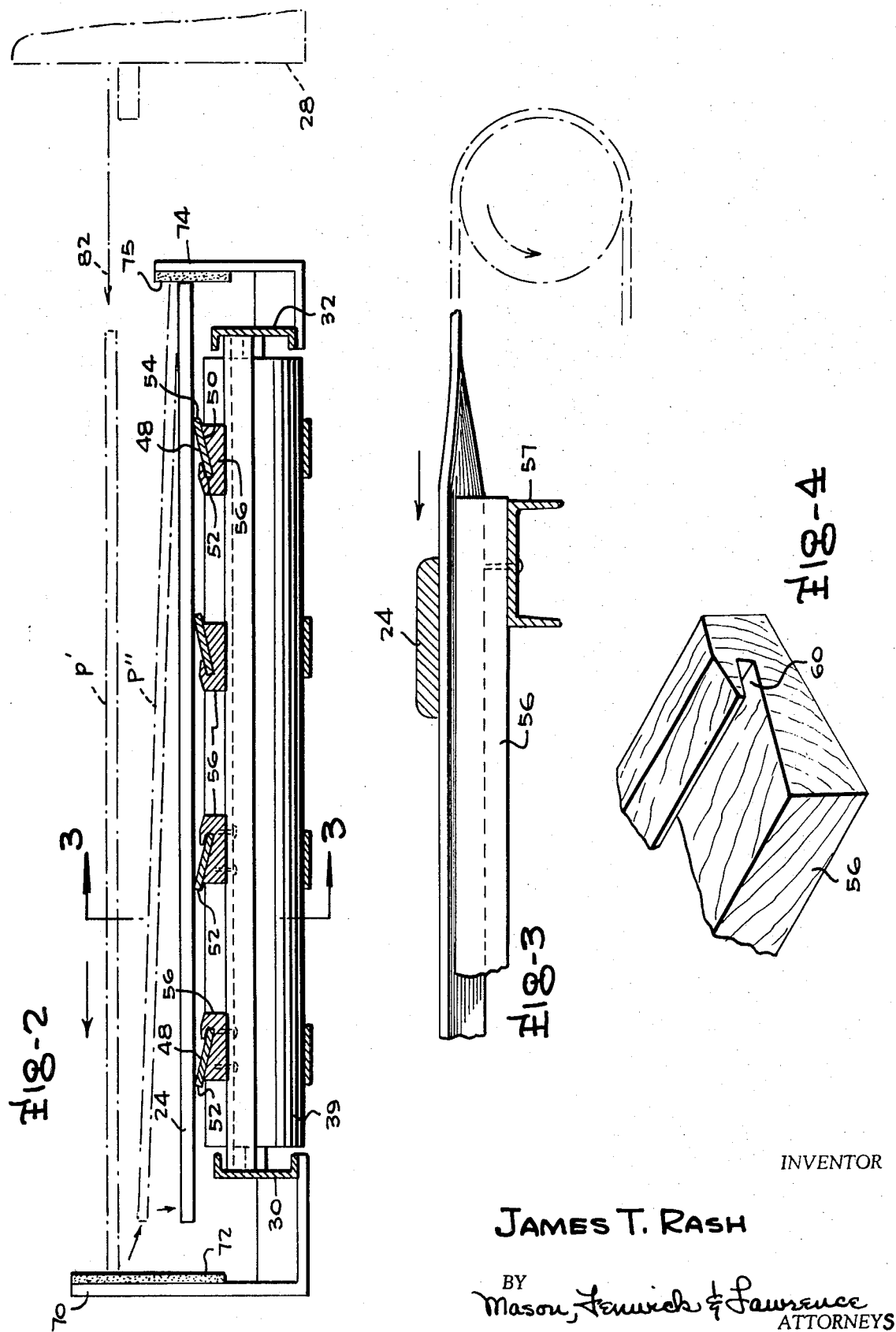

DRYER CONVEYOR MEANS

This invention is in the field of conveying and drying apparatus and is particularly directed to a unique conveyor system for receiving freshly coated elongated strips such as moulding strips for subsequent movement through a conventional dryer for drying the coating on the strips.

Many prior known devices have been employed for the purpose of moving freshly painted, or otherwise coated, articles through dryer means for drying the liquid coating on the articles. Such devices have frequently employed complicated and expensive means for conveying the work articles through the drying means. Moreover, many of the prior known devices have lacked versatility in that they are capable of usage only with articles of a particular given size or shape and cannot be used with other differently shaped or dimensioned articles. A particularly acute problem with many of the prior known devices resides in the fact that such devices support the wet work article in a manner which tends to create a blemish on the article at the point of contact between the conveyor and the article.

Additionally, the freshly coated articles are frequently blemished during the movement or handling necessary for moving the article from the coating apparatus onto the conveyor prior to movement through the drying station.

One approach to the problem of avoiding the marring of the coated article is found in U.S. Pat. No. 2,899,930 in which coated articles are projectilely fed against a stop member adjacent a specially formed conveyor to fall onto the conveyor for subsequent movement through a drying means. The device of the aforementioned patent is limited to items of a given length and requires the employment of a pair of rollers at each end of the conveyor with each belt of the conveyor being supported by one of the rollers. Additionally, each pair of rollers must be individually supported and driven since the axes of the rollers on each end are inclined with respect to each other and a common shaft cannot be used for supporting the rollers. The articles fed to the conveyor must be fed with exact precision in order to be properly positioned on the conveyor belts and variations in size or weight of the articles being coated consequently result in malfunctions of the device.

The subject invention, on the other hand, provides a uniquely simplified conveying system using only two rollers in which a single roller is employed on each end of the conveyor with plural belts extending across the rollers for supporting elongated articles positioned on the upper flights of the belts for movement through a drying means. Additionally, the subject invention is usable with a wide variety of articles of different sizes and/or shape and provides a minimum of smudging or marring of the articles in that the articles are supported solely by line contact with one corner edge of each of the conveyor belts. Additionally, the subject invention initially positions the freshly coated articles on the conveyor with a minimum of movement and smudging due to the initial positioning.

Therefore, it is the primary object of this invention to provide a new and improved dryer conveyor system.

Obtainment of the object of this invention is enabled through the provision of an elongated belt conveyor means in which two rollers are provided to support a plurality of conveyor belts extending in a generally horizontal direction with the belts having an upper flight upon which the supported articles are positioned. Guide means in the form of elongated wooden strip elements extend parallel to the belts and are provided with an inclined slot extending downwardly from the upper surface of the guide means with the upper flight of each belt riding in one of said slots so as to cant the belt to position the belt so that its uppermost termination comprises a corner edge upon which the supported articles rest so that the contact with the supported articles is limited solely to line contact.

Another feature of the subject invention resides in the fact that the articles are fed onto the conveyor by projecting them through the air transversely across the conveyor so that their forwardly projected ends engage a first abutment and the article then rebounds so that its rearmost end engages a second abutment in transverse alignment with the first abutment which slows the article down to the extent that it is then substantially vertically moved into engagement with the corner edges of the conveyor belt with little or no marring occurring.

A full understanding of the nature and operation of the subject invention will be easily achieved when the following written description is considered in light of the attached drawings in which:

FIG. 2 is a sectional view taken along lines 2—2 of FIG. 1;

FIG. 3 is a sectional view taken along lines 3—3 of FIG. 2; and

FIG. 4 is a perspective view of the ends of one of the guide members associated with each of the conveyor belts of the preferred embodiment.

Figure 1:
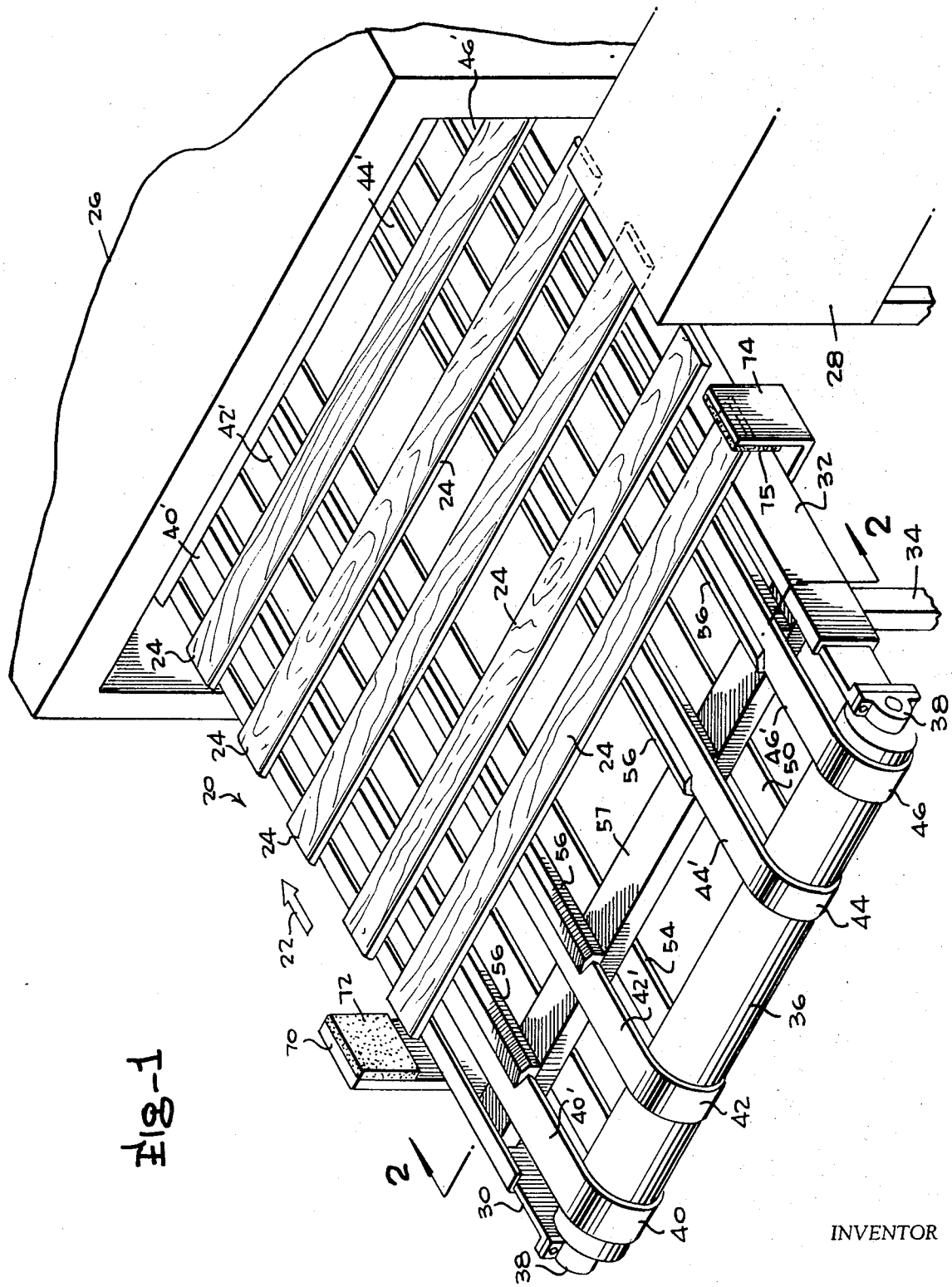
FIG. 1 is a perspective view of the preferred embodiment of the invention.

Attention is initially invited to FIG. 1 of the drawings which pictorially illustrates the essential components of the invention. The primary components include a conveyor generally designated 20 moving in the direction of an arrow 22 for supporting and conveying a plurality of freshly-coated elongated articles such as moulding strips 24 for movement through a conventional dryer 26. The strips 24 are coated by a conventional coating means 28 which projects the wet strips onto the conveyor for subsequent movement through dryer 26.

Coating means 28 is of the type which coats the articles and projects them forwardly through the air from the coating means to the left as viewed in FIG. 1 substantially perpendicular to the conveyor for deposit on the conveyor. The coating means actually forms no part of the invention and any coating means of the type such as the coating means shown in U.S. Pat. No. 2,899,930 could be employed for this purpose.

In like manner, it should be understood that the dryer means 26 can be an infra-red, hot air or any other conventional dryer construction depending upon the nature of the coating being applied to the strips and the consequent dryer requirements.

Conveyor 20 comprises first and second side frame members 30 and 32 supported by vertical post members 34 (only one of which is illustrated). A conventional upstream conveyor roller 36 is mounted in journal bearings 38 on the forward ends of the side frame members 30 and 32 in front of dryer 26 and a downstream roller 39 (FIG. 2) is similarly mounted on the opposite side of dryer 26.

Identical conveyor belts 40, 42, 44 and 46 extend about rollers 36 and 39 and driving force is imparted to roller 39 in a direction to cause movement of the upper flights 40', 42', 44' and 46' of the respective belts 40, 42, 44 and 46 in the direction of arrow 22 in FIG. 1. The drive means for moving the belts is not illustrated since it forms no part of the invention and such would merely serve to clutter the drawings. However, any conventional electric motor step-down drive through a belt or chain to the roller 39 could be employed for this purpose in a manner which would be obvious to those skilled in the art. For example, the roller 39 could be employed with a pulley or belt drive in the manner of the Stanley et al. U.S. Pat. No. 2,899,930 which has been previously discussed.

Each of the conveyor belts 40, 42, 44 and 46 is of rectangular cross-sectional configuration having an upper surface 48, a lower or inner surface 50 and first and second side surfaces 52, 54 as illustrated in FIG. 2 of the drawings.

A plurality of elongated guide members 56 supported on transverse channel members 57 extend adjacent each of the respective upper flights and are provided with an open topped slot 60 dimensioned to receive one edge of each of the respective upper belt flights to cant the flights in the manner best illustrated in FIG. 2. The guide members 56 are formed of wood strips and provide a minimum frictional resistance to movement of the belts through the slots 60. The canted orientation of the individual belts results in the uppermost extent of the belts comprising the upper corner edges defined by the intersection of the top 48 and one side edge of the belt as is clearly shown in FIG. 2 of the drawings. Consequently, strips 24 supported on the belts engage the belts solely by line contact.

A first abutment stop member 70 is positioned laterally across the conveyor 20 from the dryer 28 and has a wear face 72 as shown in FIG. 1. A second abutment stop member 74 having a wear face 75 is positioned in alignment with the first stop member 70. It should be noted that the second stop member 74 has its upper edge in a lower position than the upper edge of the first stop member 70.

Strips 24 are projected through the air from the dryer 28 in the direction of arrow 82 in FIG. 2 to strike the first abutment stop 70 on their forward ends as illustrated by the positions P' of a strip illustrated in dashed lines in FIG. 2. The strip rebounds from the first abutment stop 70 as shown in position P" in FIG. 2 to engage the second stop 74 which effectively stops lateral movement of the strip with respect to the conveyor so that the strip then moves downwardly into position on the upper flights of the conveyor belts 40 etc., as shown by the solid line strip 24 of FIG. 2. The face means 72 is selected of material to provide adequate rebound of the strip so that it will engage the second abutment 74 and the component 75 is of a material which absorbs a substantial amount of the energy of the rebounding strips so that the strip consequently moves downwardly in a substantially vertical direction for engagement with the conveyor belts.

It should be noted that the position of the second abutment stop 74 or of the first abutment stop 70 could be varied transversely with respect to the conveyor by mounting on support means extending inwardly or outwardly for various length strips.

Therefore, it will be easily appreciated that the subject invention is capable of accommodating strips of varying lengths, weights and dimensions. Moreover, the subject invention enables the usage of a single roller at each end of the conveyor requiring only a pair of support bearings while enabling the supporting flights of the belts to be canted to provide a minimum amount of contact (and resultant smudging) with the articles being conveyed. Consequently, the subject invention represents both a substantial advance in economy of fabrication in the initial cost and is functionally superior to the known devices of the same general type.

While the belts illustrated in FIG. 2 are shown with the leftmost belts 40 and 42 canted with their right edges in the downward position and with the rightmost belts 44 and 46 canted with their left edges in the downward position, it should be understood that the belts could be canted all in the same manner or adjacent belts could be canted alternately in opposite directions if desired. These and many other modifications will occur to those skilled in the art without departing from the spirit and scope of the invention which is to limited solely by the appended claims.

I claim:

1. A conveyor system for supporting wet-coated elongated members for movement through a dryer station for enabling the drying of said members, said conveyor system comprising first and second parallel roller members, belt members of rectangular cross-section extending over said first and second roller members to define an upper elongated member supporting belt flight, belt canting means engageable with said upper belt flights for canting the orientation of said flights about its longitudinal axis so that the highest part of the flights constitutes a corner defined by the intersection of two of the surfaces of said belts so that only line contact is made between said belts and said elongated members supported on said flights.

2. The invention of claim 1 wherein said belt canting means comprises an elongated element having a longitudinal axis extending parallel to said upper belt flight, a slot extending downwardly from an upper surface of said element with said flights being received within said slots, said slots being of general rectangular configuration and canted with respect to the axis of said upper belt flights to consequently cant said upper belt flights in an angle with respect to the axis of said upper belt flight.

3. The invention of claim 2 wherein said belt canting members are formed of wood.

* * * * *